United States Patent [19]

Ikeda et al.

[11] Patent Number: 5,019,949
[45] Date of Patent: May 28, 1991

[54] SOLID ELECTROLYTIC CAPACITOR

[75] Inventors: Hironosuke Ikeda; Nobuhiro Furukawa; Koji Nishio, all of Hirakata; Masahisa Fujimoto, Osaka; Hitoshi Ono, Yokohana; Osamu Ando, Kawasaki, all of Japan

[73] Assignees: Sanyo Electric Co., Ltd., Osaka; Mitsubishi Kasei Corporation, Tokyo, both of Japan

[21] Appl. No.: 493,688

[22] Filed: Mar. 15, 1990

Related U.S. Application Data

[63] Continuation-in-part of Ser. No. 353,821, May 18, 1989, abandoned.

[30] Foreign Application Priority Data

| May 20, 1988 | [JP] | Japan | 63-123646 |
| May 20, 1988 | [JP] | Japan | 63-123648 |
| May 20, 1988 | [JP] | Japan | 63-123649 |
| May 20, 1988 | [JP] | Japan | 63-123650 |

[51] Int. Cl.⁵ ............................................. H01G 9/00
[52] U.S. Cl. ..................................... 361/525; 29/25.03
[58] Field of Search ............... 361/523, 524, 525, 528; 29/25.03

[56] References Cited

U.S. PATENT DOCUMENTS 4,780,796  10/1988  Fukuda et al. ............... 361/525
4,803,596  2/1989  Hellwig et al. ............... 361/525

FOREIGN PATENT DOCUMENTS

| 33142 | 9/1978 | Japan | 29/570.1 |
| 60-17909 | 1/1985 | Japan . | |
| 60-22311 | 2/1985 | Japan . | |
| 60-70719 | 4/1985 | Japan . | |
| 60-244017 | 12/1985 | Japan . | |
| 60-245111 | 12/1985 | Japan . | |
| 60-245209 | 12/1985 | Japan . | |
| 60-250614 | 12/1985 | Japan . | |
| 61-2315 | 1/1986 | Japan . | |
| 61-10230 | 1/1986 | Japan . | |
| 61-22613 | 1/1986 | Japan . | |
| 61-22614 | 1/1986 | Japan . | |
| 61-47621 | 3/1986 | Japan . | |
| 61-47625 | 3/1986 | Japan . | |
| 118509 | 5/1987 | Japan | 361/525 |

Primary Examiner—Donald A. Griffin
Attorney, Agent, or Firm—Wenderoth, Lind & Ponack

[57] ABSTRACT

A solid electrolytic capacitor is disclosed wherein use is made of an electrode produced by simultaneously forming an oxide film layer and a conductive polymer layer through electrolytic oxidation or other chemical treatments on a metal subjected to a surface roughening treatment, or forming a conductive polymer layer through plasma polymerization or other chemical treatments on a metal successively subjected to surface roughening and anodic oxidation treatments.

11 Claims, 1 Drawing Sheet

SOLID ELECTROLYTIC CAPACITOR

This application is a continuation-in-part of now abandoned application, Ser. No. 07/353,821 filed on May 18, 1989 now abandoned.

BACKGROUND OF THE INVENTION

The present invention relates to a solid electrolytic capacitor comprising a conductive polymer as a solid electrolyte.

A conventional solid electrolytic capacitor comprises an electrode on the anode side composed of a film forming metal, such as aluminum or tantalum, coated with an oxide film; a solid electrolyte, such as manganese dioxide or TCNQ (7,7,8,8-tetracyanoquinodimethane) salt, deposited on the oxide film; and an electrode on the cathode side composed of a conductive metal layer or the like and provided on the reverse side of the oxide film.

However, the use of manganese dioxide as the solid electrolyte has drawbacks such as damage to the oxide film of the electrode on the anode side and poor restorability of the oxide film by manganese dioxide.

By contrast, the use of a TCNQ salt as the solid electrolyte has advantages such as high conductivity by virtue of usual powdery crystal form, freedom from the above described damage to the oxide film and superiority to manganese dioxide in the oxide film restoration.

However, since the conductivity of the TCNQ salt is fixed, it is difficult to realize a solid electrolytic capacitor complying with desired electrical characteristics.

For this reason, a conductive polymer was used as a solid eletrolyte formed on the oxide film to develop a solid electrolytic capacitor free from the damage to the oxide film and capable of providing desired electrical characteristics such as a resistance loss which can be freely set in an appropriate range.

Examples of this type of solid electrolytic capacitor known in the art include those described in Japanese Patent Laid-Open Nos. 61-10230/1986, 61-47621/1986, 60-70719/1985, 60-245111/1985, 60-245209/1985, 60-250614/1985, 60-244017/1985, 61-2315/1986, 61-47625/1986, 61-22614/1986, 61-22613/1986, 60-22311/1985, and 60-17909/1985.

In these solid electrolytic capacitors, use is made of an electrode comprising an oxide film formed on the surface of film-forming metal and, disposed thereon, a conductive polymer through electrolytic polymerization or chemical polymerization.

However, in these conventional electrolytic capacitors, since the conductive polymer layer is formed on the oxide film layer in a laminated form, it is difficult to successively adhere the oxide film layer to the conductive layer, so that a small space is formed between these layers. This unfavorably brought about a problem of a lowering in the capacity.

SUMMARY OF THE INVENTION

An object of the present invention is to provide a solid electrolytic capacitor which is excellent in electrical properties and in the adhesion between the anode oxide layer and the conductive polymer layer and free from the formation of a small space between these layers.

Another object of the present invention is to provide a solid electrolytic capacitor which is excellent in the adhesion between the oxide film layer and the conductive polymer layer and free from the formation of a small space between these layers.

The solid electrolytic capacitor according to the first invention comprises an electrode produced by conducting electrolytic oxidation in an electrolyte containing a monomer of a conductive polymer dissolved therein through the use of a metal subjected to surface roughening treatment as an anode to simultaneously form an anodic oxidation layer and a conductive polymer layer on the metal.

The solid electrolytic capacitor according to the second invention comprises an electrode produced by simultaneously forming through chemical treatment an anodic oxide film layer and a conductive polymer layer on a metal subjected to surface roughening treatment, and more particularly comprises an electrode formed by carrying an oxidizing agent of the surface of a metal subjected to surface roughening treatment and forming a conductive polymer through chemical polymerization to chemically and simultaneously conduct the oxidation of the metal and the formation of a conductive polymer layer.

In the second invention described above, since the surface roughening treatment and formation of the anodic oxide film layer and the conductive polymer layer is carried out simultaneously while the oxidizing agent is being carried on the metal surface, the generation of the noxious oxide film, which is likely to be produced by reaction of the metal surface with oxide and moisture in the atmosphere, and the solvents in the surface treatment and active gases, can be minimized. Thus, a capacity having desired electric conductivity can be obtained.

The solid electrolytic capacitor according to the third invention comprises an electrode produced by forming a conductive polymer layer through plasma polymerization on the surface of a metal successively subjected to a surface roughening treatment and anodic oxidation treatment.

The solid electrolytic capacitor according to the fourth invention comprises an electrode produced by providing a porous base material having a space sufficient for carrying an oxidizing agent and soluble in a particular solvent on the surface of a metal successively subjected to surface roughening treatment and anodic oxidation treatment, forming a conductive polymer through polymerization within the porous base material, and dissolving the porous base material in the solvent to remove the same.

DETAILED DESCRIPTION OF THE INVENTION

The above-described metal used in the present invention may be in various forms, such as cylinder, sheet, or foil.

The material of the metal may be any of those used in usual electrolytic capacitors, such as aluminum, tantalum, or titanium.

A metal sheet per se may be used as the metal. Alternately, a sinter or the like prepared by press-molding metal powder and sintering the resultant molding may also be used.

The conductive polymer used in the present invention may be a polymer having conjugated double bonds in its main chain, and examples thereof include polyacetylene, polythiophene, polypyrrole, poly-para-phenylene, polyaniline, polyimidazole, polythiazole, and polyfuran. Among them, preferred are an aniline polymer and polymers having a nitrogen, oxygen, oxygen or sulfur atom as a hetero atom and selected form five- and six-membered heterocyclic ring compounds having a conjugated π-electron system, such as polyaniline polythiophene, and polypyrrole.

Preferable examples of the monomer used in the synthesis of the above described conductive polymers include pyrrole and thiophene compounds having no substituent at the 2- and 5-positions of a ring skeleton structure of pyrrole or thiophene.

Among them, specific examples of the pyrrole compound include pyrrole, N-methylpyrrole, N-ethylpyrrole, N-n-propylpyrrole, N-n-butylpyrrole, N-phenylpyrrole, N-toluylpyrrole, N-naphthylpyrrole, 3-methylpyrrole, 3,5-dimethylpyrrole, 3-ethylpyrrole, 3-n-propylpyrrole, 3-n-butylpyrrole, 3-phenylpyrrole, 3-methoxypyrrole, 3-naphthylpyrrole, 3,5-dimethoxypyrrole, 3-ethoxypyrrole, 3-n-propoxypyrrole, 3-phenoxypyrrole, 3-methyl-N-methylpyrrole, 3-methoxy-N-methylpyrrole, 3-chloropyrrole, 3-bromopyrrole, 3-methylthiopyrrole, and 3-methylthio-N-methylpyrrole.

Specific examples of the thiophene compound include 2,2'-bithiophene, 3-methyl-2,2'-bithiophene, 3,3'-dimethyl-2,2'-bithiophene, 3,4-dimethyl-2,2'-bithiophene, 3,4-dimethyl-3',4'-dimethyl-2,2'-bithiophene, 3-methoxy-2,2'-bithiophene, 3,3'-dimethoxy-2,2'-bithiophene, 2,2',5',2''-terthiophene, 3-methyl-2,2',5',2''-terthiophene, and 3,3'-dimethyl-2,2',5',2''-terthiophene.

The oxidizing agent is used in an amount of usually 0.001 to 10,000 times by mole, preferably 0.005 to 5,000 times by mole based on the above-described compound having conjugated double bonds, depending upon the amount of formation of the polymer.

Compounds exhibiting polymerization activity against the above-described compound having conjugated double bonds may be used as the oxidizing agent alone or in a combination of two or more of them. In general, metal salts having a strong acid residue, a halogen, or a cyano, peroxides, etc. are used, and specific examples thereof include $Fe(ClO_4)_3$, $Fe(BF_4)_3$, $Fe_2(SiF_6)_3$, $Cu(ClO_4)_2$, $Cu(BF_4)_2$, $CuSiF_6$, $FeCl_3$, $CuCl_2$, $K_3[Fe(CN)_6]$, $RuCl_3$, $MoCl_5$, $WCl_6$, $(NH_4)_2S_2O_8$, $K_2S_2O_8$, $Na_2S_2O_8$, $NaBO_3$, and $H_2O_2$. These compounds may have water of crystallization and may be used in the form of an aqueous solution.

Examples of the dopant added to the above-described conductive polymers include $BF_4-$, $ClO_4-$, $Pf_6-$, $AsF_6-$, $CF_3SO_3-$, $I-$, $Br-$, $Cl-$, and $F-$.

As described above, when an oxide film and a conductive polymer layer are simultaneously formed on a roughened surface of a metal, the surface of contact of the oxide film with the conductive polymer is very uneven. This contributes to not only an increase in the area of contact between the oxide film and the conductive polymer but also a remarkable improvement in the adhesion between the oxide film and the conductive polymer. Further, this increase in the adhesion between the oxide film and the conductive polymer prevents formation of a small space between the oxide film layer and the conductive polymer layer.

Further, since the growth of the oxide film is hindered by formation of the conductive polymer, the thickness of the oxide film is remarkably reduced.

The above-described improvement in the contact area and the adhesion and reduction in the thickness of the oxide film contribute to an increase in the capacity per unit volume of a capacitor. In particular, the increase in the adhesion improves the resistance to mechanical stress, which suppresses the peeling of the oxide film layer form the conductive polymer layer, so that a lowering in the capacity is prevented.

Figure 1:
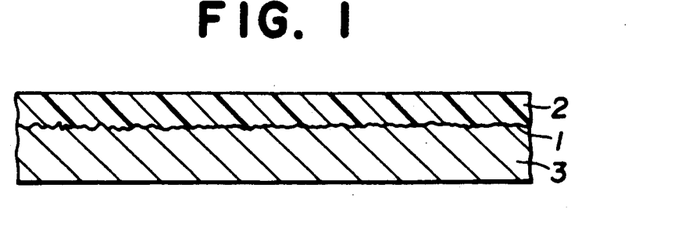
FIG. 1 is a schematic view of a boundary between an oxide film layer and a condutive polymer layer in the solid electrolytic capacitor according to the first and second inventions instant application.
Figure 2:
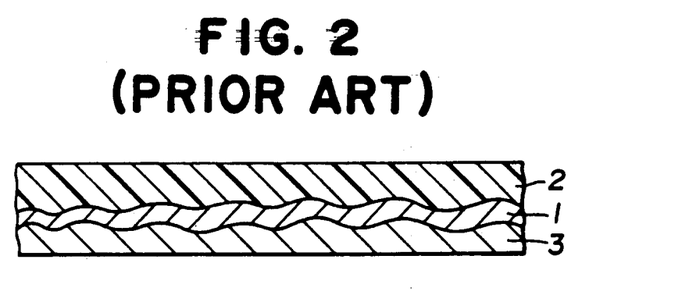
FIG. 2 is a schematic view of a boundary between an oxide film layer and a conductive polymer layer in the conventional solid electrolytic capacitor shown for comparison with the first and second inventions of the instant application.

Specifically, in the electrode of the present invention, as shown in FIG. 1, the boundary between an oxide film layer 1 formed on the surface of a metal 3 and a conductive polymer layer 2 is very uneven, while as shown in FIG. 2 the conventional electrode has no significant unevenness. Further, the thickness of the oxide film per se according to the present invention is much smaller than that of the conventional oxide film.

DESCRIPTION OF THE PREFERRED EMBODIMENTS

The present invention will now be described in more detail with reference to the following Examples.

EXAMPLES OF THE FIRST INVENTION

Example 1

The surface of an aluminum foil having a thickness of 20 μm was subjected to a roughening treatment through etching with hydrochloric acid. Constant-current electrolysis was conducted by using the aluminum foil as an anode, platinum as a cathode, and an aqueous hydrofluoroboric acid solution containing dissolved aniline as an electrolyte.

The constant-current electrolysis caused an aluminum oxide layer and a polyaniline layer to be simultaneously formed on the surface of the aluminum foil. The product was used as an electrode, and solid electrolytic capacitor A-1 of the invention was prepared by, e.g., spirally enfolding the electrode.

An oxide film was formed through electrolytic oxidation on the surface of an aluminum foil subjected to a similar roughening treatment. Thereafter, electrolytic polymerization was conducted in an aqueous hydrofluoroboric acid solution containing dissolved aniline to form polyaniline on the oxide film. The product was used as an electrode, and comparative solid electrolytic capacitor B-1 was prepared by e.g., spirally enfolding the electrode.

The capacities of the inventive capacitor A-1 and comparative capacitor B-1 were measured to find out that the capacity of capacitor A-1 was twice that of capacitor B-1.

These capacitors A-1 and B-1 were each applied to an ultrasonic vibration test. As a result, it was found that the percentage retention of the capacity after the test to that before the test was 97% for capacitor A-1 and 80% for capacitor B-1.

Example 2

The surface of an aluminum foil having a thickness of 20 μm was subjected to a roughening treatment through etching with hydrochloric acid. Constant-current electrolysis was conducted by using the aluminum foil as an anode, platinum as a cathode, and an aqueous hydrofluoroboric acid solution containing dissolved pyrrole as an electrolyte.

The constant-current electrolysis caused an aluminum oxide layer and a polypyrrole layer to be simultaneously formed on the surface of the aluminum foil. The product was used as an electrode, and solid electrolytic capacitor C-1 of the invention was prepared by e.g., spirally enfolding the electrode.

An oxide film was formed through electrolytic oxidation on the surface of an aluminum foil subjected to a similar roughening treatment. Thereafter, electrolytic polymerization was conducted in an aqueous hydrofluoroboric acid solution cantaining dissolved pyrrole to form polyaniline on the oxide film. The product was used as an electrode, and comparative solid electrolytic capacitor D-1 was prepared by, e.g., spirally enfolding the electrode.

The capacities of the capacitors C-1 and D-1 were measured to find out that the capacity of inventive capacitor C-1 was 2.1 times that of comparative capacitor D-1.

These capacitors C-1 and D-1 were each applied to an ultrasonic vibration test. The test showed that the percentage retention of the capacity after the test to that before the test was 96% for capacitor C-1 and 81% for capacitor D-1.

Example 3

The surface of an aluminum foil having a thickness of 20 μm was subjected to a roughening treatment through etching with hydrochloric acid. Constant-current electrolysis was conducted by using the aluminum foil as an anode, platinum as a cathode, and an aqueous hydrofluoroboric acid solution containing dissolved thiophene as an electrolyte.

The constant-current electrolysis caused and aluminum oxide layer and a polythiophene layer to be simultaneously formed on the surface of the aluminum foil. The product was used as an electrode, and solid electrolytic capacitor E-1 of the invention was prepared by, e.g., spirally enfolding the electrode.

An oxide film was formed through electrolytic oxidation on the surface of an aluminum foil subjected to a similar roughening treatment. Thereafter, electrolytic polymerization was conducted in an aqueous hydrofluoroboric acid solution dissloved thiophene to form polythiophene on the oxide film. The product was used as an electrode, and comparative solid electrolytic capacitor F-1 was prepared by, e.g., spirally enfolding the electrode.

The capacities of the capacitors E-1 and F-1 were measured to find out that the capacity of capacitor E-1 was 1.7 times that of capacitor F-1.

These capacitors E-1 and F-1 were each applied to an ultrasonic vibration test. The test showed that the percentage retention of the capacity after the test to that before the test was 95% for inventive capacitor E-1 and 82 % for comparative capacitor F-1.

Example 4

The surface of an aluminum foil having a thickness of 20 μm was subjected to a roughening treatment through etching with hydrochloric acid. Constant current electrolysis was conducted by using the aluminum foil as an anode, platinum as a cathode, and an aqueous hydroflouroboric acid solution contaning dissolved aniline as an electrolyte.

The constant-current electrolysis caused an aluminum oxide layer and a polyaniline layer to be simultaneously formed on the surface of the aluminum foil. The product was used as an electrode, and solid electrolytic capacitor G-1 of the invention was prepared by, e.g., spirally enfolding the electrode.

An oxide film was formed through electrolytic oxidation on the surface of an aluminum foil subjected to a similar roughening treatment. Thereafter, electrolytic polymerization was conducted in an aqueous hydrofluoroboric acid solution containing dissolved aniline to form polyaniline on the oxide film. The product was used as an electrode, and comparative solid electrolytic capacitor H-1 was prepared by, e.g., spirally enfoldng the electrode.

The capacities of the capacitors G-1 and H-1 were measured to find out that the capacity of inventive capacitor G-1 was 1.5 times that of comparative capacitor H-1.

These capacitors G-1 and H-1 were each applied to an ultrasonic vibration test. The test showed that the percentage retention of the capacity after the test to that before the test was 94% for capacitor G-1 and 77% for capacitor H-1.

Example 5

The surface of an aluminum sinter was subjected to a roughening treatment through etching with hydrochloric acid. Constant-current electrolysis was conducted by using the aluminum sinter as an anode, platinum as a cathode, and an aqueous hydrofluoroboric acid solution containing dissolved aniline as an electrolyte.

The constant-current electrolysis caused an aluminum oxide layer and a polyaniline layer to be simultaneously formed on the surface of the aluminum sinter. The product was used as an electrode, and solid electrolytic capacitor I-1 of the invention was prepared by, e.g., spirally enfolding the electrode.

An oxide film was formed through electrolytic oxidation on the surface of an aluminum sinter subjected to a similar roughening treatment. Electrolytic polymerization was then conducted in an aqueous hydrofluoroboric acid solution containing dissolved aniline to form polyaniline on the oxide film. The product was used as an electrode and comparative solid electrolytic capacitor J-1 was prepared by, e.g., spirally enfolding the electrode.

The capacities of the capacitors I-1 and J-1 were measured to find out that the capacity of inventive capacitor I-1 was 2.3 times that of comparative capacitor J-1.

These capacitors I-1 and J-1 were each applied to an ultrasonic vibration test. The test showed that the percentage retention of the capacity after the test to that before the test was 98% for capacitor I-1 and 83% for capacitor J-1.

EXAMPLES OF THE SECOND INVENTION

Example 6

The surface of an aluminum foil having a thickness of 20 μm was subjected to a roughening treatment through etching with hydrochloric acid. Thereafter, aniline was carried on the surface of the aluminum foil subjected to the roughening treatment by coating with aniline or immersion in aniline.

The aluminum foil was immersed in an aqueous hydrofluoroboric acid solution containing dissolved cupric fluoroborate, thereby oxidizing the roughened surface of the aluminum foil and, at the same time, chemically polymerizing aniline carried on the roughened surface to form a polyaniline layer. Thus, the electrode according to the second invention was prepared. Solid electrolytic capacitor A-2 of the present invention was prepared by, e.g., spirally enfolding this electrode.

An oxide film was formed through electrolytic oxidation on the surface of an aluminum foil subjected to a similar roughening treatment. Thereafter, aniline was carried on the surface of the aluminum foil subjected to the roughening treatment by coating with aniline or immersion in aniline. The aluminum foil was then immersed in an aqueous hydrofluoroboric acid solution containing dissolved cupric fluoroborate, thereby chemically polymerizing aniline carried on the roughened surface to form a polyaniline layer. Thus, a comparative electrode was prepared. Comparative solid electrolytic capacitor B-2 was prepared by, e.g., spirally enfolding this electrode.

The capacities of capacitors A-2 and B-2 were measured to find out that the capacity of inventive capacitor A-2 was 2.5 times that of comparative capacitor B-2.

These capacitors A-2 and B-2 were each applied to an ultrasonic vibration test. The test showed that the percentage retention of the capacity after the test to that before the test was 97% for capacitor A-2 and 81% for capacitor B-2.

Example 7

The surface of an aluminum foil having a thickness of 20 μm was subjected to a roughening treatment through etching with hydrochloric acid. Thereafter, pyrrole was carried on the surface of the aluminum foil subjected to the roughening treatment by coating with pyrrole or immersion in pyrrole.

The aluminum foil was immersed in an aqueous hydrofluoroboric acid solution containing dissolved cupric fluoroborate, thereby oxidizing the roughened surface of the aluminum foil and, at the same time, chemically ploymerizing pyrrole carried on the roughened surface to form a polypyrrole layer. Thus, the electrode according to the present invention was prepared. Solid electrolytic capacitor C-2 of the invention was prepared by, e.g., spirally enfolding this electrode.

An oxide film was formed through electrolytic oxidation on the surface of an aluminum foil subjected to similar roughening treatment. Thereafter, pyrrole was carried on the surface of the aluminum foil subjected to the roughening treatment by coating with pyrrole or immersion in pyrrole. The aluminum foil was then immersed in an aqueous hydrofluoroboric acid soultion containing dissolved cupric flururoboride, thereby chemically polymerizing pyrrole carried on the roughened surface to form a polypyrrole layer. Thus, a comparative electrode was prepared. Comparative solid electrolytic capacitor D-2 was prepared by, e.g., spirally enfolding this electrode.

The capacities of capacitors C-2 and D-2 were measured to find out that the capacity of inventive capacitor C-2 was 2.1 times that of comparative capacitor D-2.

These capacitors C-2 and D-2 were each applied to an ultrasonic vibration test. The test showed that the percentage retention of the capacity after the test to that befor the test was 95% for capacitor C-2 and 79% for capacitor D-2.

Example 8

The surface of an aluminum foil having a thickness of 20 μm was subjected to a roughening treatment through etching with hydrochloric acid. Thereafter, thiophene was carried on the surface of the aluminum foil subjected to the roughening treatment by coating with thiophene or immersion in thiophene.

The aluminum foil was immersed in an aqueous hydrofluoroboric acid solution containing dissolved cupric fluoroboride, thereby oxidizing the roughened surface of the aluminum foil and, at the same time, chemically polymerizing thiophene carried on the roughened surface to form a polythiophene layer. Thus, the electrode according to the present invention was prepared. Solid electrolytic capacitor E-2 of the present invention was prepared by, e.g., spirally enfolding this electrode.

An oxide film was formed through electrolytic oxidation on the surface of an aluminum foil subjected to similar roughening treatment. Thereafter, thiophene was carried on the surface of the aluminum foil subjected to the roughening treatment by coating with thiophene or immersion in thiophene. The aluminum foil was then immersed in an aqueous hydrofluoroboric acid solution containing dissolved cupric fluoroborate, thereby chemically polymerizing thiophene carried on the roughened surface to form a polythiophene layer. Thus, a comparative electrode was prepared. Comparative solid electrolytic capacitor F-2 was prepared by, e.g., spirally enfolding this electrode.

The capacities of capacitors E-2 and F-2 were measured to find out that the capacity of inventive capacitor D-2 was twice that of comparative capacitor F-2.

These capacitors E-2 and F-2 were each applied to an ultrasonic vibration test. The test showed that the percentage retention of the capacity after the test to that before the test was 96% for capacitor E-2 and 83% for capacitor F-2.

Example 9

The surface of an aluminum sinter having a thickness of 20 μm was subjected to a roughening treatment through etching with hydrochloric acid. Thereafter, aniline was carried on the surface of the aluminum sinter subjected to the roughening treatment by coating with aniline or immersion in aniline.

The aluminum sinter was then immersed in an aqueous hydrofluoroboric acid, thereby oxidizing the roughened surface of the aluminum sinter and, at the same time, chemically polymerizing aniline carried on the roughened surface to form a polyaniline layer. Thus, the electrode according to the present invention was prepared. Solid electrolytic capacitor G-2 of the present invention was prepared by, e.g., spirally enfolding this electrode.

An oxide film was formed through electrolytic oxidation on the surface of an aluminum sinter subjected to similar roughening treatment. Thereafter, aniline was carried on the surface of the aluminum sinter subjected to the roughening treatment by coating with aniline or immersion in aniline. The aluminum sinter was then immersed in an aqueous hydrofluoroboric acid solution containing dissolved cupric fluoroborate, thereby chemically polymerizing aniline carried on the roughened surface to form a polyaniline layer. Thus, a comparative electrode was prepared. Comparative solid electrolytic capacitor H-2 was prepared by, e.g. spirally enfolding this electrode.

The capacities of capacitors G-2 and H-2 were measured to find out that the capacity of capacitor G-2 was 2.6 times that of capacitor H-2.

These capacitors G-2 and H-2 were each applied to an ultrasonic vibration test. The test showed that the percentage retention of the capacity after the test to that before the test was 99% for capacitor G-2 and 85% for capacitor H-2.

EXAMPLES OF THE THIRD INVENTION

Next, in the third invention of the instant application, when a conductive polymer layer is prepared through plasma polymerization as described above, it is possible to make the thickness of the polymer layer much smaller than that of the polymer layer prepared through conventional electrolytic polymerization and chemical polymerization. Furthermore, since this conductive polymer layer enters the unevenness on the surface of the base material, the substantial area of contact between the oxide film and the conductive polymer layer is remarkably increased and, at the same time, the adhesion between the oxide film and the conductive polymer layer is remarkably improved.

The increase in the contact area contributes to an increase in the capacity of the capacitor, and the reduction in the thickness of the conductive polymer layer contributes to an increase in the capacity per unit volume.

Further, the improvement in the adhesion between the oxide film and the conductive polymer prevents the conductive polymer from being peeled off from the oxide film by vibration or with the lapse of time, which suppresses a lowering in the capacity of the capacitor.

Figure 3:
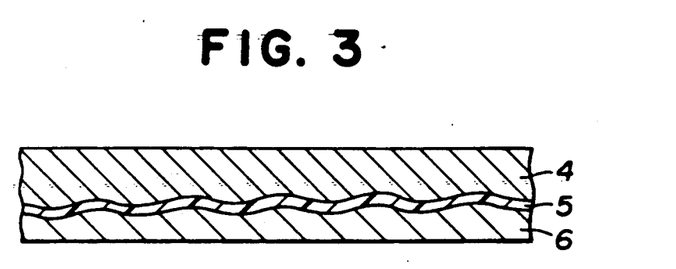
FIGS. 3 and 5 are schematic views of a boundary between an oxide film layer and a conductive polymer layer in the solid electrolytic capacitor according to the third and fourth invention, respectively, of the instant application.

Specifically, according the third invention, as shown in FIG. 3, since the oxide film layer 4 completely adheres to the conductive polymer layer 5, the surface area of the oxide film layer 4 can be effectively used.

Figure 4:
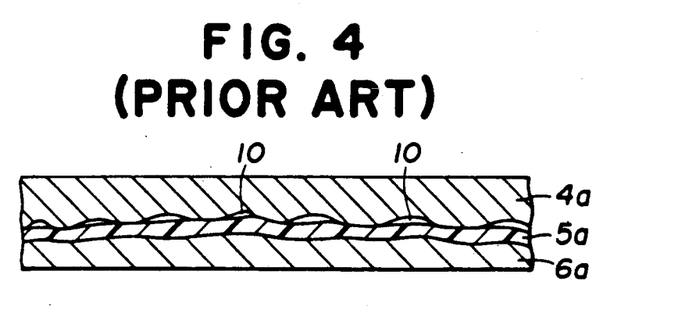
FIG. 4 is a schematic view of a boundary between an oxide film layer and a conductive polymer layer in the conventional solid electrolytic capacitor shown for comparison with the third and forth inventions of the instant application.

On the other hand, in the conventional solid electrolytic capacitor, as shown in FIG. 4, the oxide film layer 4a does not completely adhere to the conductive polymer layer 5a, and voids 10 are present in various places, which makes it impossible to effectively utilize the surface area of the oxide film layer 4a. In FIGS. 3 and 4 of the drawing, numerals 6 and 6a designate electrodes on the cathode side.

The third invention will now be described in more detail with reference to the following Examples.

Example 10

The surface of an aluminum foil having a thickness of 20 μm was subjected to a roughening treatment through etching with hydrochloric acid. Plasma polymerization was conducted on the aluminum foil for 10 min under conditions of an aniline vapor pressure of 0.5 Torr, an oxygen partial pressure of 0.5 Torr and a plasma discharge power of 30W to simultaneously form an aluminum oxidation layer and a polyaniline layer. Then, solid electrolytic capacitor A-3 of the invention was prepared by spirally enfolding the electrode thus obtained.

An aluminum foil subjected to similar roughening treatment was used as an anode, and electrolysis was conducted in an aqueous nitric acid solution at a direct current density of 1 to 5mA/cm$^2$ to form an oxide film layer on the foil for use as a dielectric. This aluminum foil was immersed in an aqueous hydrofluoroboric acid solution containing aniline. A polyaniline layer was formed on the surface of oxide film through electrolytic polymerization to prepare an electrode. Comparative solid electrolytic capacitor B-3 was prepared by spirally enfolding the electrode thus obtained.

Further, FeCl$_3$ as an oxidizing agent was carried on an aluminum foil subjected to similar roughening and anodic oxidation treatments, and the aluminum foil was exposed to an aniline vapor to chemically polymerize aniline, thereby preparing an electrode having a polyaniline layer formed on the surface thereof by vapor phase polymerization. Comparative solid electrolytic capacitor C-3 was prepared by spirally enfolding the electrode.

The capacities of capacitors A-3, B-3, and C-3 were measured to find out that the capacity of inventive capacitor A-3 was 2.0 times that of comparative capacitor B-3 and 2.3 times that of comparative capacitor C-3.

Further, capacitors A-3, B-3, and C-3 were each applied to an ultrasonic vibration test. The test showed that the percentage retention of the capacity after the test to that before the test was 99% for capacitor A-3, 80% for capacitor B-3, and 83% for capacitor C-3.

Example 11

The surface of an aluminum foil having a thickness of 20 μm was subjected to a roughening treatment through etching with hydrochloric acid. Plasma polymerization was conductd on the aluminum foil for 10 min under conditions of pyrrole vapor pressure of 0.5 Torr, an oxygen partial pressure of 0.5 Torr and a plasma discharge power of 30W to simultaneously form an aluminum oxidation layer and a polypyrrole layer. Then, solid electrolytic capacitor D-3 of the invention was prepared by spiraly enfolding the electrode thus obtained.

An aluminum foil subjected to similar roughening treatment was used as an anode, and electrolysis was conducted in an aqueous nitric acid solution at a direct current density of 1 to 5 mA/cm$^2$ to form an oxide film layer on the foil for use as a dielectric. This aluminum foil was immersed in an aqueous hydrofluoroboric acid solution containing dissolved pyrrole. A polypyrrole layer was formed on the surface of the film through electrolytic polymerization to prepare an electrode. Comparative solid electrolytic capacitor E-3 was prepared by spirally enfolding the electrode thus obtained.

Further, FeCl$_3$ as oxidizing agent was carried on an aluminum foil subjected to similar roughening and anodic oxidation treatments, and the aluminum foil was exposed to a pyrrole vapor to chemically polymerize pyrrole, thereby preparing an electrode having a polypyrrole layer formed on the surface thereof by vapor phase polymerization. Comparative solid electrolytic capacitor F-3 was prepared by spirally enfolding this electrode.

The capacities of capacitors D-3, E-3, and F-3 were measured to find out that the capacity of inventive capacitor E-3 and 2.3 times that of comparative capacitor F-3.

Further, capacitors D-3, E-3, and F-3 were each applied to an ultrasonic vibration test. The test showed that the percentage retention of the capacity after the test to that before the test was 99% for capacitor D-3, 80% for capacitor E-3, and 83% for capacitor F-3.

Example 12

The surface of an aluminum foil having a thickness of 20 μm was subjected to a roughening treatment through etching with hydrochloric acid. Plasma polymerization was conducted on the aluminum foil for 10 min under conditions of a thiophene vapor pressure of 0.5 torr, and oxygen partial pressure of 0.5 Torr and a plasma discharge power of 30W to simultaneously form an aluminum oxidation layer and a polythiophene layer. Then, solid electrolytic capacitor G-3 of the invention was prepared by spirally enfolding the electrode thus obtained.

An aluminum foil subjected to similar roughening treatment was used as an anode, and electrolysis was conducted in an aqueous nitric acid solution at a direct current density of 1 to 5 $mA/cm^2$ to form an oxide film layer on the foil for use as a dielectric. Thus aluminum foil was immersed in an aqueous hydrofluoroboric acid solution containing dissolved thiophene. A polythiophene layer was formed on the surface of the coating through electrode. Comparative solid electrolytic capacitor H-3 was prepared by spirally enfolding the electrode thus prepared.

Further $FeCl_3$ as an oxidizing agent was carried on an aluminum foil subjected to similar roughening and anodic oxidation treatments, and the aluminum foil was exposed to a thiophene vapor to chemically polymerize thiophene, thereby preparing an electrode having a polythiophene layer formed on the surface thereof by vapor phase polymerization. Comparative solid electrolytic capacitor I-3 was prepared by spirally enfolding the electrode.

The capacities of capacitors G-3, H-3, and I-3 were measured to find out the capacity of inventive capacitor G-3 and 2.3 times that of comparative capacitor I-3.

Further, capacitors G-3, H-3, and I-3 were each applied to an ultrasonic vibration test. The test showed that the percentage retention of the capacity after the test to that before the test was 99% for capacitor G-3, 80% for capacitor H-3, and 83% for capacitor I-3.

Example 13

The surface of an aluminum sinter having a thickness of 20 μm was subjected to a roughening treatment through etching with hydrochloric acid. Plasma polymerization was conducted on the aluminum sinter for 10 min under conditions of an aniline vapor pressure of 0.5 Torr, an oxygen partial pressure of 0.5 Torr and a plasma discharge power of 30W to form simultaneously an aluminum oxidation layer and a polyaniline layer. Then, solid electrolytic capacitor J-3 of the present invention was prepared by spirally enfolding the electrode thus obtained.

An aluminum sinter subjected to similar roughening treatment was used as an anode an electrolysis was conducted in an aqueous nitric acid solution at a direct current density of 1 to 5 $mA/cm^2$ to form an oxide film layer on the sinter for use as a dielectric. This aluminum sinter was immersed in an aqueous hydrofluoroboric acid solution containing dissolved aniline. A polyaniline layer was formed on the surface of the anodic film through electrolytic polymerization to prepare an electrode. Comparative solid electrolytic capacitor K-3 was prepared by spirally enfolding the electrode thus obtained.

The capacities of capacitors J-3, K-3, and L-3 were measured to find out that the capacity of inventive capacitor J-3 was 2.0 times that of comparative capacitor K-3 and 2.3 times that of comparative capacitor L-3.

Further, capacitors J-3, K-3, and L-3 were each applied to an ultrasonic vibration test. The test showed that the percentage retention of the capacity after the test to that before the test was 99% for capacitor J-3, 80% for capacitor K-3, and 83% for capacitor L-3.

Examples of the fourth invention

Next, in the fourth invention of the instant application, the conductive polymer, the monomer used for the synthesis of the conductive polymer, and the oxidizing agent for the compound having conjugated double bonds may be the same as those used above.

A space size capable of carrying an oxidizing agent at least in a molecular state or in the form of an agglomerate suffices for the above-described space capable of carrying the oxidizing agent. It is unfavorable that the space is too narrow to carry an oxidizing agent in the form of a molecule, or too large to carry an oxidizing agent in the form of an agglomerate.

This space is distributed in the form of various pores or voids on or within a porous base material It is known that the space has such a size that the mean pore diameter is 0.001 to 100 μm, preferably 0.005 to 50 μm and the depth is 0.001 μm or more, preferably 0.005 μm or more in the case of a pore.

The above-described porous base material may be made of butyl rubber, natural rubber, styrene-butadiene rubber, chloroprene rubber, neoprene rubber, acrylic acid-butadiene rubber, polyvinyl acetate, polyvinyl chloride, polyvinyl acetal, polyvinyl ether, nitrocellulose, acetylcellulose, ethylcellulose, methylcellulose, glue, starch, dextrin, or casein but is not limited to these only.

Although there is no particular limitation on the reaction temperature for polymerizing the conductive polymer in the porous base material as far as the above-described compound having conjugated double bonds can be polymerized, the reaction is usually conducted at −20 to 150° C., preferably 0 to 100° C.

The reaction time for the polymerization is usually 0.01 to 200 hr, preferably 0.02 to 100 hr, depending upon the reaction temperature, the amount of the oxidizing agent, and the amount of the compound having conjugated double bonds.

The polymerization reaction causes a homogeneous dark brown or black polymer to be formed on the base material at portions carrying the oxidizing agent.

It is also possible to increase the amount of a polymer or to form two or more types of polymers by a method which comprises further carrying an oxidizing agent on the above-described conductive polymer once formed, bringing a compound having conjugated double bonds of the same type as or different from the above compound into contact with the oxidizing agent to continue the polymerization reaction.

After the completion of the polymerization reaction, the compound having conjugated double bonds and the oxidizing agent remaining on the porous base material may be removed or left as they are. When the compound and the oxidizing agent are to be removed, a solvent capable of dissolving the porous base material is preferably used.

Examples of such a solvent include hydrocarbons such as hexane and cyclohexane, chlorinated hydrocarbons such as trichloroethylene, aromatic hydrocarbons such as benzene, ketones such as methyl ethyl ketone, alcohols such as methanol, fatty acid esters such as methyl acetate, tetrahydrofuran, dioxane, ethylene chloride, methyl cellosolve, methyl-1-butynol, methyl-1-butynol methyl-1-pentynol, and water.

The dopants added to the above described conductive polymers may be the same as those described above, and examples thereof include $BF_4-$, $ClO_4-$, $PF_6-$, $AsF_6-$, $CF_3SO_3-$, $I-$, $Br-$, $Cl-$, and $F-$.

In the solid electrolytic capacitor according to the fourth invention, a metal subjected to both of the roughening and anodic oxidation treatments and a conductive polymer layer are formed in an integral form.

For this reason, the adhesion between the metal and the conductive polymer layer is so high that not only the surface area of the oxide film can be effectively utilized but also there occurs no peeling phenomenon because of high resistance to mechanical stress. This contributes to an increase in the capacity and further enables prevention of a lowering in the capacity caused by peeling.

Figure 5:
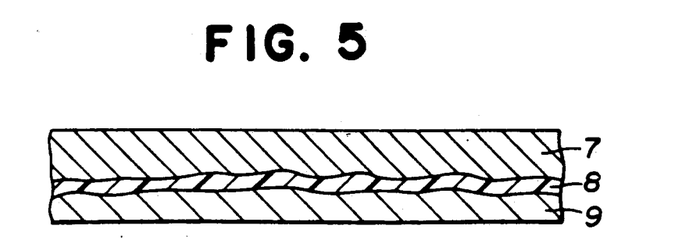

Specifically, according to the solid electrolytic capacitor of the fourth invention, as shown in FIG. 5, since the oxide film layer 7 completely adheres to the conductive polymer layer 8, the surface area of the oxide film layer 7 is effectively used.

On the other hand, as described above, in the conventional solid electrolytic capacitor, as shown in FIG. 4, the oxide film layer 4a does not completely adhere to the conductive polymer layer 5a and voids 10 are present in various place, which makes it impossible to effectively utilize the surface area of the oxide film layer 4a.

The fourth invention will now be described in more detail with reference to the following Examples.

Example 14

The surface of an aluminum foil having a thickness of 20 μm was subjected to a roughening treatment through etching with hydrochloric acid. Then, electrolysis was conducted in an aqueous boric acid solution at a direct current density of 1 to 5 mA/cm$^2$ by making use of the aluminum foil as an anode to form an oxide film layer (dielectric) on the aluminum foil.

A solution of butyl rubber (NBR) and $Fe(ClO_4)_3$ in methyl ethyl ketone was applied to the surface of the treated aluminum foil with a doctor blade and dried to evaporate methyl ethyl ketone, thereby forming a butyl rubber layer carrying $Fe(ClO_4)_3$ as an oxidizing agent.

The thus formed composite comprising the aluminum foil and the butyl rubber layer was immersed in aniline to chemically polymerize aniline in a space carrying the above-described oxidizing agent within the butyl rubber layer through the action of the oxidizing agent to form polyaniline, and the resulting composite was immersed in methyl ethyl ketone to remove the butyl rubber layer, thereby preparing the electrode of the present invention.

A polyaniline layer formed after the removal of the butyl rubber layer was completely adhered to the surface of the aluminum foil.

Solid electrolytic capacitor A-4 of the invention was prepared by spirally enfolding the electrode thus obtained.

An aluminum foil subjected to similar roughening and anodic oxidation treatments was immersed in an aqueous hydrofluoroboric acid solution containing dissolved aniline. A polyaniline layer was formed on the surface of the anodic film through electrolytic polymerization to prepare an electrode. Comparative solid electrolytic capacitor B-4 was prepared by spirally enfolding the electrode thus obtained.

Further, $Fe(ClO_4)_3$ as an oxidizing agent was carried on an aluminum foil subjected to similar roughening and anodic oxidation treatments, and then the aluminum foil was exposed to an aniline vapor to chemically polymerize aniline, thereby preparing an electrode having a polyaniline layer formed on the surface thereof by vapor phase polymerization. Comparative solid electrolytic capacitor C-4 was prepared by spirally enfolding the electrode thus obtained.

The capacities of capacitors A-4, B-4, and C-4 were measured to find out that the capacity of inventive capacitor A-4 was 2.0 times that of comparative capacitor B-4 and 2.3 times that of comparative capacitor C-4.

Further, capacitors A 4, B-4, and C-4 were each applied to an ultrasonic vibration test. The test showed that the percentage retention of the capacity after the test to that before the test was 99% for capacitor A-4, 80% for capacitor B-4, and 83% for capacitor C-4.

Example 15

The surface of an aluminum foil having a thickness of 20 μm was subjected to a roughening treatment through etching with hydrochloric acid. Then, electrolysis was conducted in an aqueous boric acid solution at a direct current density of 1 to 5 mA/cm$_2$ by making use of the aluminum foil as an anode to form an oxide film layer (dielectric) on the aluminum foil.

A solution of butyl rubber (NBR) and $Fe(ClO_4)_3$ in methyl ethyl ketone was applied to the surface of the treated aluminum foil with a doctor blade and dried to evaporate methyl ethyl ketone, thereby forming a butyl rubber layer carrying $Fe(ClO_4)_3$ as an oxidizing agent.

The formed composite was immersed in pyrrole to chemically polymerize pyrrole in a space carrying the above-described oxidizing agent within the butyl rubber layer through the action of the oxidizing agent to form polypyrrole and the resulting composite was immersed in methyl ethyl ketone to remove the butyl rubber layer, thereby preparing the electrode of the present invention.

A polypyrrole layer formed after the removal of the butyl rubber layer was completely adhered to the surface of the aluminum foil.

Solid electrolytic capacitor D-4 of the present invention was prepared by spirally enfolding the electrode thus obtained.

An aluminum foil subjected to similar roughening and anodic oxidation treatments was immersed in an aqueous hydrofluoroboric acid solution containing dissolved pyrrole. A polypyrrole layer was formed on the surface of the anodic film through electrolytic polymerization to prepare an electrode. Comparative solid electrolytic capacitor E-4 was prepared by spirally enfolding the electrode thus obtained.

Further, $Fe(ClO_4)_3$ as an oxidizing agent was carried on an aluminum foil subjected to similar roughening and anodic oxidation treatments, and the aluminum foil was exposed to a pyrrole vapor to chemically polymerize pyrrole, thereby preparing an electrode having a polypyrrole layer formed on the surface thereof by vapor phase polymerization Comparative solid electrolytic capacitor F-4 was prepared by spirally enfolding the electrode thus obtained The capacities of capacitors D-4, E-4, and F-4 were measured to find out that the capacity of inventive capacitor D-4 was 1.9 times that of comparative capacitor E-4 and 1.8 times that of comparative capacitor F-4.

Further, capacitors D 4, E-4, and F-4 were each applied to an ultrasonic vibration test. The test showed that the percentage retention of the capacity after the test to that before the test was 98% for capacitor D-4, 81% for capacitor E-4, and 78% for capacitor F-4.

Example 16

The surface of an aluminum foil having a thickness of 20 μm was subjected to a roughening treatment through etching with hydrochloric acid. Then, electrolysis was conducted in an aqueous boric acid solution at a direct current density of 1 to 5 mA/cm$^2$ by making use of the aluminum foil as an anode to form an oxide film on the aluminum foil.

A solution of butyl rubber (NBR) and $Fe(ClO_4)_3$ in methyl ethyl ketone was applied to the surface of the treated aluminum foil with a doctor blade and dried to evaporate methyl ethyl ketone, thereby forming a butyl rubber layer carrying $Fe(ClO_4)_3$ as an oxidizing agent.

The thus formed composite was immersed in thiophene to chemically polymerize thiophene in a space carrying the above-described oxidizing agent with the butyl rubber layer through the action of the oxidizing agent to form polythiophene, and the resulting composite was immersed in methyl ethyl ketone to remove the butyl rubber layer, thereby preparing the electrode of the present invention.

A polythiophene layer formed after the removal of the butyl rubber layer was completely adhered to the surface of the aluminum foil.

Solid electrolytic capacitor G-4 of the present invention was prepared by spirally enfolding the electrode thus obtained.

An aluminum foil subjected to similar roughening and anodic oxidation treatments was immersed in an aqueous hydrofluoroboric acid solution containing dissolved thiophene. A polypyrrole layer was formed on the surface of the anodic film through electrolytic polymerization to prepare an electrode. Comparative solid electrolytic capacitor H-4 was prepared by spirally enfolding the electrode thus obtained.

Further, $Fe(ClO_4)_3$ as an oxidizing agent was carried on an aluminum foil subjected to similar roughening and anodic oxidation treatments, and the aluminum foil was exposed to a thiophene vapor to chemically polymerize thiophene, thereby preparing an electrode having a polythiopene layer formed on the surface thereof by vapor phase polymerization. Comparative solid electrolytic capacitor I-4 was prepared by spirally enfolding the electrode thus obtained.

The capacities of capacitors G-4, H-4, and I-4 were measured to find out that the capacity of inventive capacitor G-4 was 2.1 times that of comparative capacitor H-4 and 1.9 times that of comparative capacitor I-4.

Further, capacitors G-4, H-4, and I-4 were each applied to an ultrasonic vibration test. The test showed that the percentage retention of the capacity after the test to that before the test was 99% for capacitor G-4, 81% for capacitor H-4, and 81% for capacitor I-4.

Example 17

The surface of an aluminum foil having a thickness of 20 μm was subjected to a roughening treatment through etching with hydrochloric acid. Then, electrolysis was conducted in an aqueous boric acid solution at a direct current density of 1 to 5 mA/cm$^2$ by making use of the aluminum foil as an anode to form an oxide film on the aluminum foil for use as a dielectric.

A solution of butyl rubber (NBR) and $Fe(ClO_4)_3$ in methyl ethyl ketone was applied to the surface of the treated aluminum foil with a doctor blade and dried to evaporate methyl ethyl ketone, thereby forming a butyl rubber layer carrying $Fe(ClO_4)_3$ as an oxidizing agent.

The formed composite was immersed in aniline to chemically polymerize aniline in a space carrying the above-described oxidizing agent within the butyl rubber layer through the action of the oxidizing agent to form polyaniline, and the resulting composite was immersed in methyl ethyl ketone to remove the butyl rubber layer, thereby preparing the electrode of the present invention.

A polyaniline layer formed after the removal of the butyl rubber layer completely adhered to the surface of the aluminum foil.

Solid electrolytic capacitor J-4 of the invention was prepared by spirally enfolding the electrode thus obtained.

An aluminum foil subjected to similar roughening and anodic oxidation treatments was immersed in an aqueous hydrofluoroboric acid solution containing dissolved aniline. A polyaniline layer was formed on the surface of the anodic film through electrolytic polymerization to prepare an electrode. Comparative solid electrolytic capacitor K-4 was prepared by spirally enfolding the electrode thus obtained.

Further, $Fe(ClO_4)_3$ as an oxidizing agent was carried on an aluminum foil subjected to similar roughening and anodic oxidation treatments, and the aluminum foil was exposed to an aniline vapor to chemically polymerize aniline, thereby preparing an electrode having a polyaniline layer formed on the surface thereof by vapor phase polymerization. Comparative solid electrolytic capacitor L-4 was prepared by spirally enfolding the electrode thus obtained.

The capacities of capacitors J-4, K-4, and L-4 were measured to find out that the capacity of inventive capacitor J-4 was 2.3 times that of comparative capacitor K-4 and 2.0 times that of comparative capacitor L-4.

Further, capacitors J-4, K-4, and L-4 were each applied to an ultrasonic vibration test The test showed that the percentage retention of the capacity after the test to that before the test was 99% for capacitor J-4, 82% for capacitor K 4, and 80% for capacitor L-4.

As described above, the present invention can provide a solid electrolytic capacitor having excellent characteristics such as remarkably increased capacity and reduced lowering in the capacity caused by mechanical stress.

What is claimed is:

1. A solid electrolytic capacitor comprising an electrode, wherein said electrode is formed by means for conducting electrolytic oxidation in an electrolyte containing a monomer of a conductive polymer dissolved therein through the use of a metal having a roughened surface as an anode to thereby simultaneously form an anodic oxidation layer and a conductive polymer layer on said metal.

2. The solid electrolytic capacitor according to claim 1, wherein said electrolyte is an aqueous hydrofluoroboric acid solution and wherein electrolytic polymerization is conducted in said aqueous hydrofluoroboric acid solution simultaneously with oxidation of said metal.

3. The solid electrolytic capacitor according to claim 1, wherein said conductive polymer contains polyaniline.

4. The solid electrolytic capacitor according to claim 1, wherein said conductive polymer layer simultaneously formed with said anodic oxidation layer is used as a negative electrode of said electrolytic capacitor.

5. The solid electrolytic capacitor according to claim 1, wherein said monomer is selected from a pyrrole and thiophene compound having no substituent at the 2- and 5-positions of the ring skeleton structure of the pyrrole or thiophene.

6. The solid electrolytic capacitor comprising an electrode, wherein said electrode is formed by means for simultaneously forming through chemical treatments an anodic oxide film layer and a condutive polymer layer on the surface of a metal subjected to a roughening treatment.

7. The solid electrolytic capacitor comprising an electrode, wherein said electrode is formed by means for carrying an oxidizing agent on the surface of a metal and subjecting the metal surface to a roughening treatment and forming a conductive polymer through chemical polymerization to thereby chemically and simultaneously conduct the oxidation of said metal and the formation of the conductive polymer layer.

8. A solid electrolytic capacitor comprising an electrode, wherein said electrode is formed by means for simultaneously forming an oxidation layer and a conductive polymer layer through plasma polymerization on the surface of a metal which has been subjecting to a roughening treatment.

9. A solid electrolytic capacitor comprising an electrode, wherein said electrode is formed simultaneously and chemically by providing a porous base material having a space sufficient for carrying an oxidizing agent and soluble in a particular solvent on the surface of a metal which metal is treated by means for subjecting it to roughening and anodic oxidation treatments, forming a conductive polymer through polymerization within said porous base material, and dissolving said porous base material in said solvent to remove said porous base material.

10. The solid electrolytic capacitor according to claim 9, wherein a reaction temperature for polymerizing said conductive polymer in said porous base material is −20° C. to 150° C.

11. The solid electrolytic capacitor according to claim 9, wherein said solvent is an aqueous hydrofluoroboric acid solution.

* * * * *